United States Patent
Anand et al.

(10) Patent No.: US 12,487,845 B2
(45) Date of Patent: Dec. 2, 2025

(54) MODULAR DECOMPOSITION AND COMPOSITION OF CONTAINER SOFTWARE MANAGEMENT CLUSTERS IN HYBRID CLOUD

(71) Applicant: International Business Machines Corporation, Armonk, NY (US)

(72) Inventors: Vishal Anand, Dublin (IE); John Paul Easton, Bradley (GB); Ulrike Vauth, Boeblingen (DE); Srinivas Koushik, New Albany, OH (US); Reena Sandhir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 17/806,615

(22) Filed: Jun. 13, 2022

(65) Prior Publication Data

US 2023/0401077 A1 Dec. 14, 2023

(51) Int. Cl.
| | |
|---|---|
| G06F 9/455 | (2018.01) |
| G06F 9/445 | (2018.01) |
| G06F 9/50 | (2006.01) |

(52) U.S. Cl.
CPC ...... *G06F 9/45558* (2013.01); *G06F 9/44505* (2013.01); *G06F 9/5077* (2013.01);
(Continued)

(58) Field of Classification Search
CPC .................................................. G06F 9/45558
(Continued)

(56) References Cited

U.S. PATENT DOCUMENTS

| | | | |
|---|---|---|---|
| 11,487,591 B1* | 11/2022 | Featonby | G06F 9/45558 |
| 12,020,025 B1* | 6/2024 | Zhang | G06F 8/433 |

(Continued)

FOREIGN PATENT DOCUMENTS

| | | |
|---|---|---|
| CN | 103391214 B | 4/2017 |
| CN | 112783646 A | 5/2021 |
| CN | 113572862 A | 10/2021 |

OTHER PUBLICATIONS

"Backup and migrate Kubernetes resources and persistent volumes", Velero, last printed Jun. 8, 2022, 14 pages, <https://velero.io/>.
"Cluster Cloner", GitHub, last printed Jun. 8, 2022, 3 pages, <https://github.com/doitintl/ClusterCloner>.
"Kubernetes Cluster Federation", GitHub, last printed Jun. 8, 2022, 3 pages, <https://github.com/kubernetes-sigs/kubefed>.
(Continued)

*Primary Examiner* — Mehran Kamran
(74) *Attorney, Agent, or Firm* — Michael A. Petrocelli

(57) ABSTRACT

Replicating a software cluster which includes control software and containers in another computing environment can include software operators which can be generated relating to modular functionalities of a control software cluster. The software operators are derived from analyzing the control software cluster. The software operators further being derived from analyzing code of the control software cluster including the containers, and from analyzing software configurations for the control software cluster. The generating of the software operators can include, at least in part, determining software configuration requirements for the control software cluster. The generating of the software operators including at least in part, creating a template for the control software cluster based on the determined software configuration requirements and the analysis of the another software computing environment. All or a portion of the software operators of the control software cluster can be replicated in the another software computing environment.

15 Claims, 7 Drawing Sheets

(52) U.S. Cl.
CPC .............. *G06F 2009/45595* (2013.01); *G06F 2209/505* (2013.01)

(58) Field of Classification Search
USPC .......................................................... 718/1
See application file for complete search history.

(56) References Cited

U.S. PATENT DOCUMENTS

| | | | | |
|---|---|---|---|---|
| 2011/0283194 | A1* | 11/2011 | Chen .................... | G06F 8/38 715/735 |
| 2015/0207682 | A1* | 7/2015 | Moraes Nichele ... | G06F 15/177 709/221 |
| 2018/0373551 | A1* | 12/2018 | Christensen ........ | G06F 9/44505 |
| 2019/0089581 | A1* | 3/2019 | Purandare .......... | G06Q 10/1095 |
| 2020/0136930 | A1* | 4/2020 | Szulman ............. | H04L 41/5096 |
| 2020/0387357 | A1* | 12/2020 | Mathon ................ | G06F 9/4411 |
| 2021/0011739 | A1* | 1/2021 | Baxter ................. | G06F 9/5077 |
| 2021/0055947 | A1* | 2/2021 | Mahajan ............. | G06F 9/45558 |
| 2021/0132935 | A1* | 5/2021 | Dinh .................... | G06F 9/4411 |
| 2021/0149648 | A1* | 5/2021 | Velammal ............ | G06N 20/00 |
| 2021/0200814 | A1* | 7/2021 | Tal ...................... | G06F 16/90335 |
| 2021/0208974 | A1* | 7/2021 | Balcha ................ | G06F 9/45558 |
| 2021/0303368 | A1* | 9/2021 | Yu ....................... | G06F 9/00 |
| 2021/0325785 | A1* | 10/2021 | Hodel .................. | G06F 8/65 |
| 2022/0116452 | A1* | 4/2022 | Rafey ................. | G06F 18/24137 |
| 2022/0414478 | A1* | 12/2022 | Karri ................... | G06N 5/025 |
| 2023/0048653 | A1* | 2/2023 | Tripathi ............... | G06F 8/60 |
| 2023/0244466 | A1* | 8/2023 | Shah ................... | G06F 8/63 717/178 |
| 2023/0401077 | A1* | 12/2023 | Anand ................ | G06F 9/44505 |

OTHER PUBLICATIONS

"Kubernetes Multi-cluster Deployment: Kubernetes Cluster Federation and KubeSphere", Kubesphere, Technology Blog, Jul. 20, 2020, 12 pages, <https://kubesphere.io/blogs/multi-cluster-deployment/>.

"KUDO: The Kubernetes Universal Declarative Operator", last printed Jun. 8, 2022, 3 pages, <https://kudo.dev/>.

"Operator pattern", Kubernetes, Last modified May 25, 2022, 2 pages, <https://kubernetes.io/docs/concepts/extend-kubernetes/operator/>.

"Virtual Kubelet", GitHub, last printed Jun. 8, 2022, 11 pages, <https://github.com/virtual-kubelet/virtual-kubelet>.

"What is Liqo?", Computer Networks Labs, last printed Jun. 8, 2022, 6 pages, <https://liqo.io/>.

Arbezzano, et al., "Simplifying multi-clusters in Kubernetes", Cloud Native Computing Foundation, Blog/Community Post, Apr. 12, 2021, 10 pages, <https://www.cncf.io/blog/2021/04/12/simplifying-multi-clusters-in-kubernetes/>.

Dobies, et al., "Kubernetes Operators: Automating the Container Orchestration Platform", Red Hat, O'Reilly Books, © 2020, 155 pages, <https://www.redhat.com/en/resources/oreilly-kubernetes-operators-automation-ebook>.

Mell, et al., "The NIST Definition of Cloud Computing", National Institute of Standards and Technology, Special Publication 800-145, Sep. 2011, 7 pages.

International Search Report and Written Opinion for International Application No. PCT/IB2023/055802, International Filing date: Jun. 6, 2023, Mailing Date: Oct. 10, 2023, 7 pages.

* cited by examiner

MODULAR DECOMPOSITION AND COMPOSITION OF CONTAINER SOFTWARE MANAGEMENT CLUSTERS IN HYBRID CLOUD

BACKGROUND

The present disclosure relates to using control software for replicating a software cluster including containers to another computing environment, for example, a hybrid cloud computing environment.

In a Kubernetes® environment, there are known methods for migration, backup/restore, cloning, using pod instantiation on foreign clusters through UI (User Interface) level abstraction and peering between clusters. Problems associated with the above methods can include a lack of a holistic disaster recovery solution available in a multi deployment scenario. In another example, a known solution, can require a pre-existing target cluster(s) in place. In another example, execution of a migration can require manual intervention for activities. Other examples can include a requirement of deep skills knowledge of the technology stack, and solutions can lack a modular components for functionality. In another example, known solutions lack a way to manage overhead, for example, more components require more management, and to manage resource overhead, for example, more components consume more resources.

In one example, disaster recovery can use cloud resources. Creating a plan that accounts for multicloud environments can be complex, as each cloud platform is likely to have its own unique disaster recovery plan. In one example, a disaster recovery plan can include on-premises with containers as a service; a public cloud container service; or a container-based platform as a service (PaaS). Some enterprises use more than one type of deployment. Each approach has some container recovery capabilities built in, but none offer a holistic solution. Management software, such as Kubernetes®, for deployment of containers in disaster recovery can include careful evaluation across an assortment of Kubernetes solutions, where different answers for issues can be applied to each cloud environments. Containers can represent new shared-responsibility handoffs in the public cloud without always clearly defining boundaries or identifying gaps. Orchestrating containers at scale can make matters more challenging. A vendor can be responsible for maintaining a control plane running across availability zones for resiliency. Additional solutions may be necessary for complete Kubernetes® disaster recovery, drawing upon other services or third-party tools. Greater shared responsibility, transparency, and facilitation can help bring clarity to other aspects of a cloud strategy.

SUMMARY

The present disclosure recognizes the shortcomings and problems associated with current techniques for deploying software clusters in a hybrid cloud environment.

There is a need for a unified solution for deploying software clusters in a hybrid cloud environment which can be performed in a holistic manner (for example, using operators) and provides users flexibility to select use-case(s) in a modular fashion. Thereby, simplifying an overall architecture (e.g., from multiple solutions to one solution for a use-case).

In an aspect according to the present invention, a computer-implemented method using control software for replicating a software cluster including container to another computing environment includes generating, using a computer, software operators relating to modular functionalities of a control software cluster. The software operators are derived from analyzing the control software cluster which includes containers in a software computing environment. The software operators further are derived from analyzing code of the control software cluster including the containers, and from analyzing software configurations for the control software cluster. The generating of the software operators includes at least in part, determining software configuration requirements for the control software cluster. The control software cluster includes the containers for running the software operators of the control software cluster in another software computing environment. The generating of the software operators includes at least in part, analyzing the another software computing environment for running the software operators of the control software cluster. The generating of the software operators includes at least in part, creating a template for the control software cluster based on the determined software configuration requirements and the analysis of the another software computing environment. The template includes data for custom resource definitions for running the software operators in the another software computing environment. The method includes replicating all or a portion of the software operators of the control software cluster in the another software computing environment based on the analysis of the another software computing environment and the software configuration requirements.

In a related aspect, the analyzing of the another software computing environment includes comparing configuration requirements of the control software cluster to the another software computing environment.

In another related aspect, the method further includes receiving, at the computer, a selection, from an operator, of components of the software computing environment for the generation of the software operators.

In a related aspect, the method further includes analyzing the software operators to determine hierarchies for each of the software operators; and recreating an instance of the control software cluster in the another software computing environment, based on the hierarchies.

In a related aspect, the control software cluster is a running application in the computing environment, wherein the running application includes software code being executed by a processor.

In a related aspect, the software computing environment and the another software computing environments are different cloud computing environments.

In a related aspect, the software operators are created in response to the analyzing of the another software computing environment and the creating of the template, the analyzing of the containers of the control software cluster to determine a hierarchy for each of the software operators.

In a related aspect, the method further includes generating a model, using the computer, wherein the model includes the following: updating the determining of the software configuration requirements for the control software cluster; updating the analyzing of the another software computing environment for running the software operators of the control software cluster; updating the generating of the software operators including at least in part, the updating of the creating of the template for the control software cluster based on the determined software configuration requirements and the analysis of the another software computing environment. The method includes updating the replicating of all or a portion of the software operators of the control software cluster in the another software computing environment based on the updated analysis of the another software computing environment and the software configuration requirements.

In a related aspect, the method further includes iteratively generating the model to produce updated models.

In another aspect according to the present invention, a system, using control software and containers, for replicating a software cluster in another computing environment, which comprises: a computer system comprising; a computer processor, a computer-readable storage medium, and program instructions stored on the computer-readable storage medium being executable by the processor, to cause the computer system to perform the following functions to; generate, using a computer, software operators relating to modular functionalities of a control software cluster, the software operators being derived from analyzing the control software cluster which includes containers in a software computing environment, the software operators further being derived from analyzing code of the control software cluster including the containers, and from analyzing software configurations for the control software cluster; the generating of the software operators includes, at least in part, to determine software configuration requirements for the control software cluster, the control software cluster including the containers for running the software operators of the control software cluster in another software computing environment; the generating of the software operators includes, at least in part, to analyze the another software computing environment for running the software operators of the control software cluster; the generating of the software operators includes, at least in part, to create a template for the control software cluster based on the determined software configuration requirements and the analysis of the another software computing environment, the template including data for custom resource definitions for running the software operators in the another software computing environment; and replicate all or a portion of the software operators of the control software cluster in the another software computing environment based on the analysis of the another software computing environment and the software configuration requirements.

In a related aspect, the analyzing of the another software computing environment includes comparing configuration requirements of the control software cluster to the another software computing environment.

In a related aspect, the system further includes performing the functions to receive, at the computer, a selection, from an operator, of components of the software computing environment for the generation of the software operators.

In a related aspect, the system further includes performing the functions to analyze the software operators to determine hierarchies for each of the software operators; and recreate an instance of the control software cluster in the another software computing environment, based on the hierarchies.

In a related aspect the control software cluster is a running application in the computing environment, wherein the running application includes software code being executed by a processor.

In a related aspect, the software computing environment and the another software computing environments are different cloud computing environments.

In a related aspect, the software operators are created in response to the analyzing of the another software computing environment and the creating of the template, the analyzing of the containers of the control software cluster to determine a hierarchy for each of the software operators.

In another aspect according to the present invention, a computer program product, using control software and container, for replicating a software cluster in another computing environment includes a computer readable storage medium having program instructions embodied therewith. The program instructions are executable by a computer to cause the computer to perform functions, by the computer, comprising the functions to: generate, using a computer, software operators relating to modular functionalities of a control software cluster, the software operators being derived from analyzing the control software cluster which includes containers in a software computing environment, the software operators further being derived from analyzing code of the control software cluster including the containers, and from analyzing software configurations for the control software cluster; the generating of the software operators includes, at least in part, to determine software configuration requirements for the control software cluster, the control software cluster including the containers for running the software operators of the control software cluster in another software computing environment; the generating of the software operators includes, at least in part, to analyze the another software computing environment for running the software operators of the control software cluster; the generating of the software operators includes, at least in part, to create a template for the control software cluster based on the determined software configuration requirements and the analysis of the another software computing environment, the template including data for custom resource definitions for running the software operators in the another software computing environment; and replicate all or a portion of the software operators of the control software cluster in the another software computing environment based on the analysis of the another software computing environment and the software configuration requirements.

In a related aspect, the analyzing of the another software computing environment includes comparing configuration requirements of the control software cluster to the another software computing environment.

In a related aspect, the computer program product further including function to receive, at the computer, a selection, from an operator, of components of the software computing environment for the generation of the software operators.

In a related aspect, the computer program product further including the functions to analyze the software operators to determine hierarchies for each of the software operators; and recreate an instance of the control software cluster in the another software computing environment, based on the hierarchies.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Figure 1:
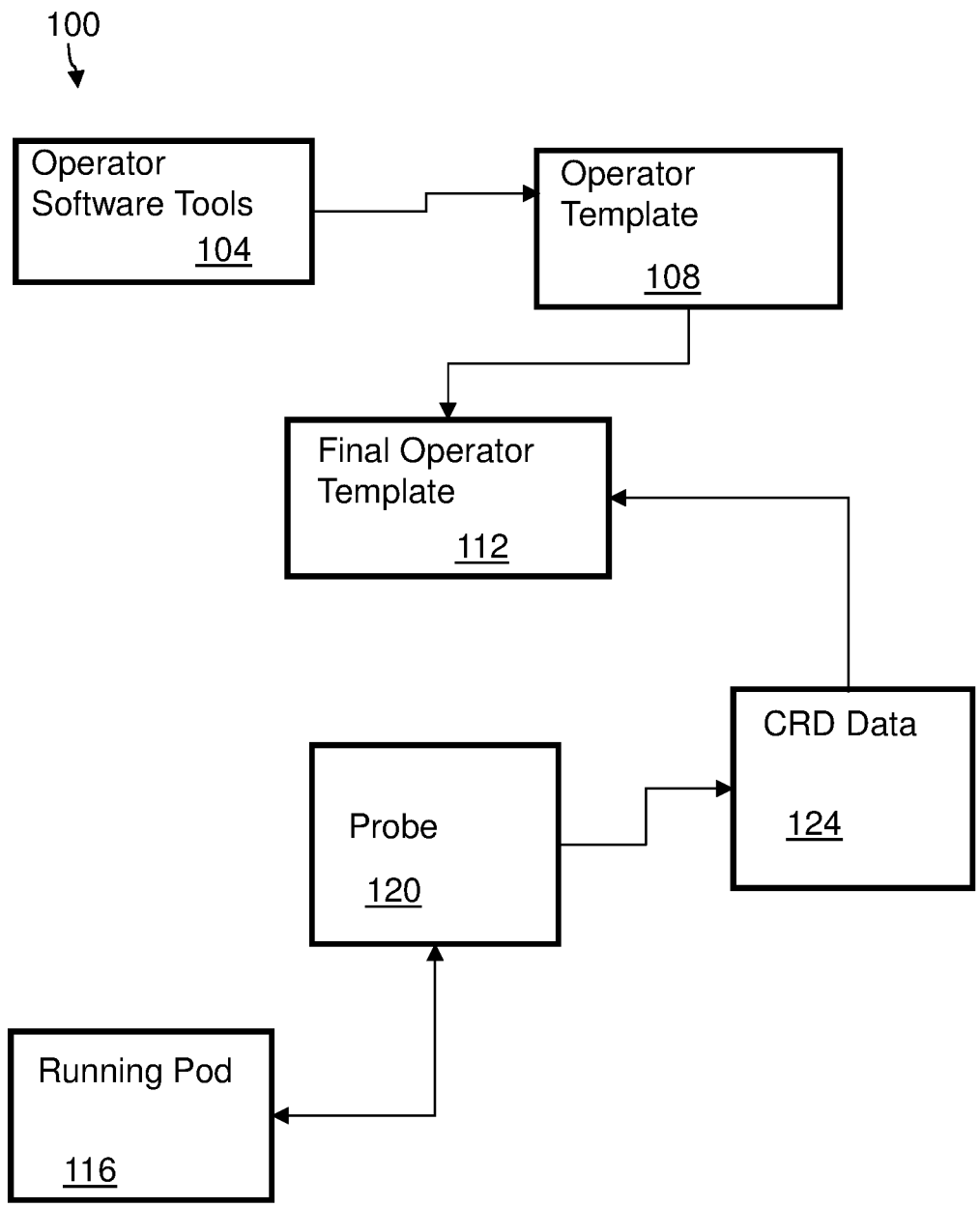
FIG. 1 is a flow chart illustrating a method according to an embodiment of the present disclosure, for replicating a software cluster including containers to another computing environment.

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments and Examples

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

According to an embodiment of the present disclosure, a method and system can include decomposing a running management software cluster or container orchestrator (for example, a Kubernetes® Cluster) in the form of operators. The software cluster can include deployments, pods, routes, secrets, services, configuration maps, software repository, image locations, daemon sets, replica sets, custom resource definitions (CRDs), namespaces, permanent virtual circuit (PVC), users, and operators. The method and system can include creating operators for desired or required codified knowledge running in a management software cluster, e.g., an operator for running software defined network configurations, an operator for software deployment service configurations, and an operator for user privileges, etc.

Referring to FIG. 1, according to an embodiment of the present disclosure, a computer-implemented system 100 for replicating a software cluster, including control software and containers, in another computing environment, includes features described below.

The system 100 includes decomposition of a software cluster into operators, using operator software tools (operator SDK) including command line tools, to create a new template for the operator including skeletons for custom resource definitions (CRDs), as in operations block 104. Thereby, the system generates an operator template as represented in block 108.

The system includes generating data for a CRD (Custom Resource Definition) as is needed to extend the template into something more useful. This in accomplished by taking existing files typical in a programming language which is used for configuration files, as a basis, and extracting data from the application code and taking code from a code repository or extracting key info as part of the DevOps toolchain, as in block 116.

Using an external probe, as in block 120, the actual configuration is examined by running a pod 116 and used as the basis of the CRD. Also used can be cloud resources (e.g., network, nodes, storage, etc.) and could be based on a cloud services platform (CSP) APIs (Application programming Interface) to retrieve information.

The system can complete the template to generate a final operator template 112 with added CRD data 124 which is verified against the running cluster and packaged for future use.

Additionally, the system includes analyzing the operators to determine operator hierarchies. Thus, having decomposed an existing container configuration into a number of operators, it is then possible to recreate an identical instance of the existing cluster in another location, such as in cloud computing environment, by running the decomposed operators. However, the operators cannot just be applied in a random order, rather operators requirements or parameters require certain resources or bits of configuration to be performed before they can be run.

For example, a typical cluster can require the following. Ensuring a network is available, and if not, starting a network. Starting a registry or ensuring that the registry can be accessed if it is remote. Starting network storage (e.g., typically using a networking protocol) that can be used by the cluster. In one example, the system can include starting master node(s), applying security configuration, starting worker node(s), and starting Pod(s). Each operator includes checking that prerequisites are in place before running.

Operators also need to ensure that for longer-running configuration tasks, that the status of the configuration activity is tracked to completion and any error conditions resolved. This can further be plugged with tiered services and RPO/RTO (Recovery Point Objective/Recovery Time Objective) can be codified within the operator accordingly. A users can also change configurations.

In one example, modular decomposition can include a plurality of functionalities which can each represent specific requirement or object. Each of a plurality of modules can represent specific functionalities. A decomposer can run as a service, and run with its controller and be accessed by users through a secure route. In another example, a target selector lets users select a target environment, and selects a right bootstrapper operator, and can trigger the bootstrapper operator's execution.

In another example, a bootstrapping process is identified and when the bootstrapping process returns information about the target, a verification step ensures, for example that the target has enough space/nodes to run the configuration that is being proposed. If there isn't enough resources, the user is informed. At this point, the user can either decide to choose another target location, or only implement a subset of the operators into this environment so that the subset of the configuration will now fit. The hierarchy of the operators created is related to decomposing the cluster. An order that the operators should run in needed in order to build the cluster. Operator prerequisites in terms of resources need to be known in order to run the operators.

In one example, the system includes triggering composition for the user specified target, and execution at a target entity. A bootstrapper process operator can start defined provisioning. Decomposed operators can extend container orchestrator software at the target. A dedicated controller for a defined task, can look at the defined desired state, comparing it with the state of the cluster, and take actions on the resources to make that state a reality in the cluster (e.g., adding replicas, adding/creating deployments). The system builds on these concepts, provides a custom controller which knows how to watch specific events, knows internal state within the cluster, and take actions to reconcile through the code we provide in set of handlers. The information that characterizes that specific knowledge is defined by extending the orchestrator software (which can include an API (Application Programming Interface)) called a custom resource. A custom resource (CR) is defined by a custom resource definition (CRD) and the CRD is designed and intended extension point in the API. The operator can build on facilities to leverage platform features and abstractions.

In one example, modular functionality can include the following. Components can be decomposed into desired components. Users can select specific operators for a target composition. Users can use an interface through route for functionalities for decomposition, bootstrappers, target locations, etc. Users can specify a time period for decomposition, and a user can specify retention of decomposed operators, and users can specify deletion time for a source cluster (e.g., a decomposed cluster).

Embodiments according to the present disclosure can include dividing a software cluster into two planes (such as a control plane/operator and a data plane), wherein the control plane includes a collection of pods and implements control loops that repeatedly compare the desired state of the cluster to its actual state and creating a snapshot of the cluster state for disaster recovery. Embodiments can further include creating an operator to deploy and manage multiple instances of software applications by using a common resource descriptor (CRD) to recover the data/applications from disasters and migrate workloads to new infrastructures/clouds/availability zones. Embodiments can include determining a relationship between the operator and a resource based on a feature value of each operator configurating one application system and information obtained about the resource which belongs to the operator, thereby grasping a status of the resource and facilitating the migration of an application to a container orchestration platform and enabling a user to select and arrange a desired operator in an operator management graphical user interface (GUI) of an application system construction unit to construct the application system having a desired configuration. Embodiments can further replicate the software cluster or its configurations by analyzing the existing configuration, producing a set of operators that can be run to reproduce the configuration in an alternative cloud environment or any target environment or landing zone, having utility in disaster recovery (DR) and in the migration of a system from one cloud provider to another or from on-premises to any cloud provider's platform and vice versa. Embodiments can further include using the modular functionality, enabling users to decompose only desired components (e.g., an existing software cluster configuration) into operators, and select specific operators only or all of them for target composition. A unique bootstrapper can be selected for each cloud environment and a custom on-premises environment, and zero-touch DR can be enabled with codified human knowledge and provide users flexibility to pick and choose components of DR. A pluggable system can be provided with tiered services thereby enabling configurable recovery point objective (RPO)/recovery time objective (RTO). Using an auto-pilot operators' maturity-based method and bootstrapper operators, a user interface (UI) can be provided for easy user-level consumption, and abstraction can be enabled from all underlying cloud providers for holistic DR.

In a further example, according to the present disclosure, building operators can be accomplished by decomposing a running configuration and automatically building both the operators and the hierarchy of operators needed to recreate the cluster. The automatic creation of the operators that are created removes the chance of user error creeping in and dramatically speeds up the time it takes to both protect an application using our invention as well as to deploy a new instance in another location. The hierarchy deploys the pre-requisites in the right order rather than just focusing on recovering the application only. The automatic decomposition of an environment into a hierarchy of operators allows the full cluster to be replicated. User intervention is not required to do this. Thus, embodiments of the present disclosure do not require operators to pre-exist thus allowing management environments with no existing operators, some existing operators or all existing required operators. The hierarchy or operators discovered by our invention allows management of all environments rather than those where everything is pre-defined. The actual running configuration can be captured rather than that which was captured via the GUI. Consider a case where an application has scaled up and is running more instances. In this situation, embodiments according to the present disclosure can handle. Thus, a running application can be deployed to a new instance of to a new location, for example, in the event of a migration or disaster. The operator construct can be used to capturing the configuration of an existing application, and through this captured configuration, (re)deploy it in a different location.

Figure 2:
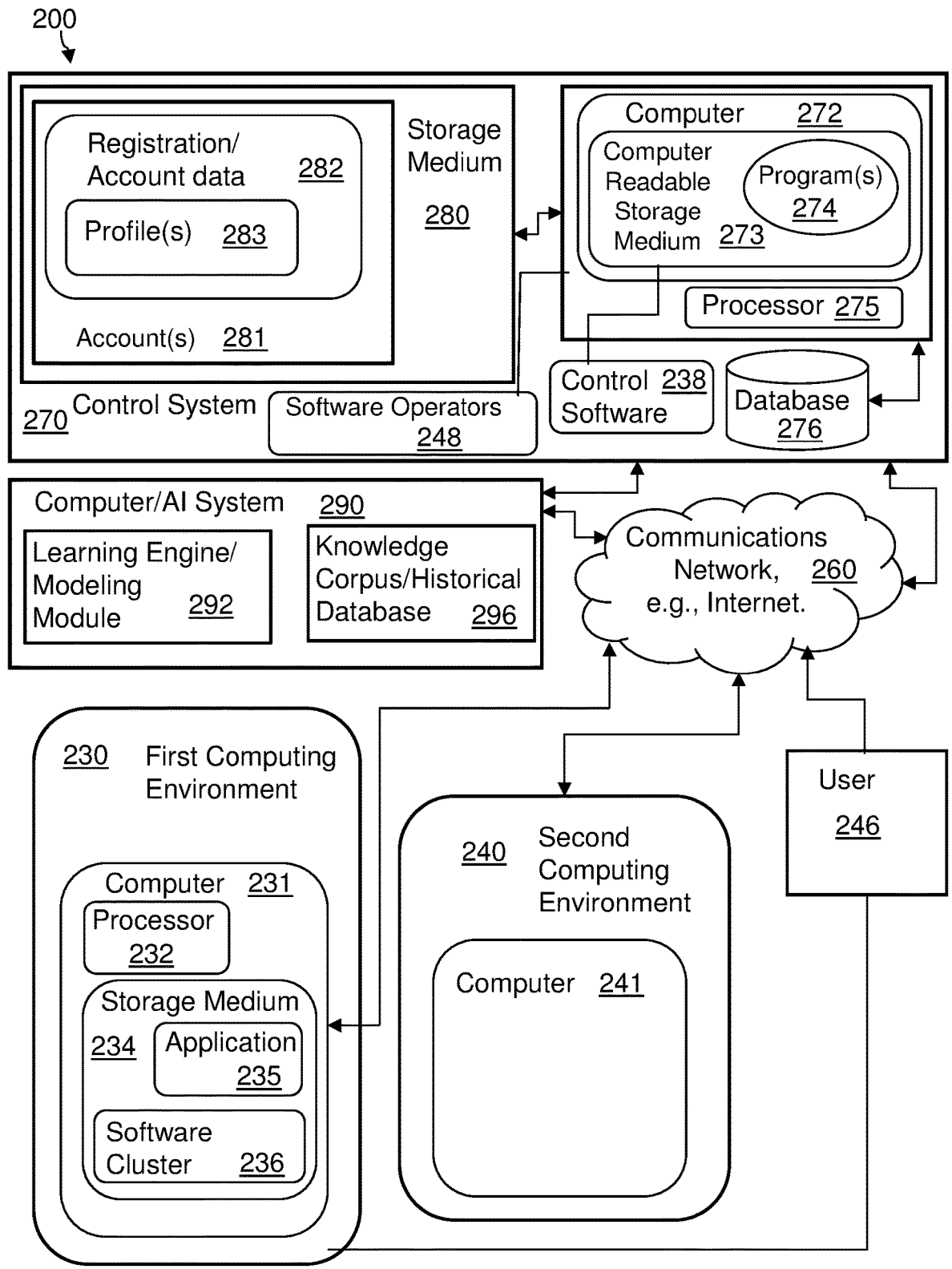
FIG. 2 is a schematic block diagram illustrating an overview of a system, system features or components, and methodology for replicating a software cluster including containers to another computing environment.
Figure 3:
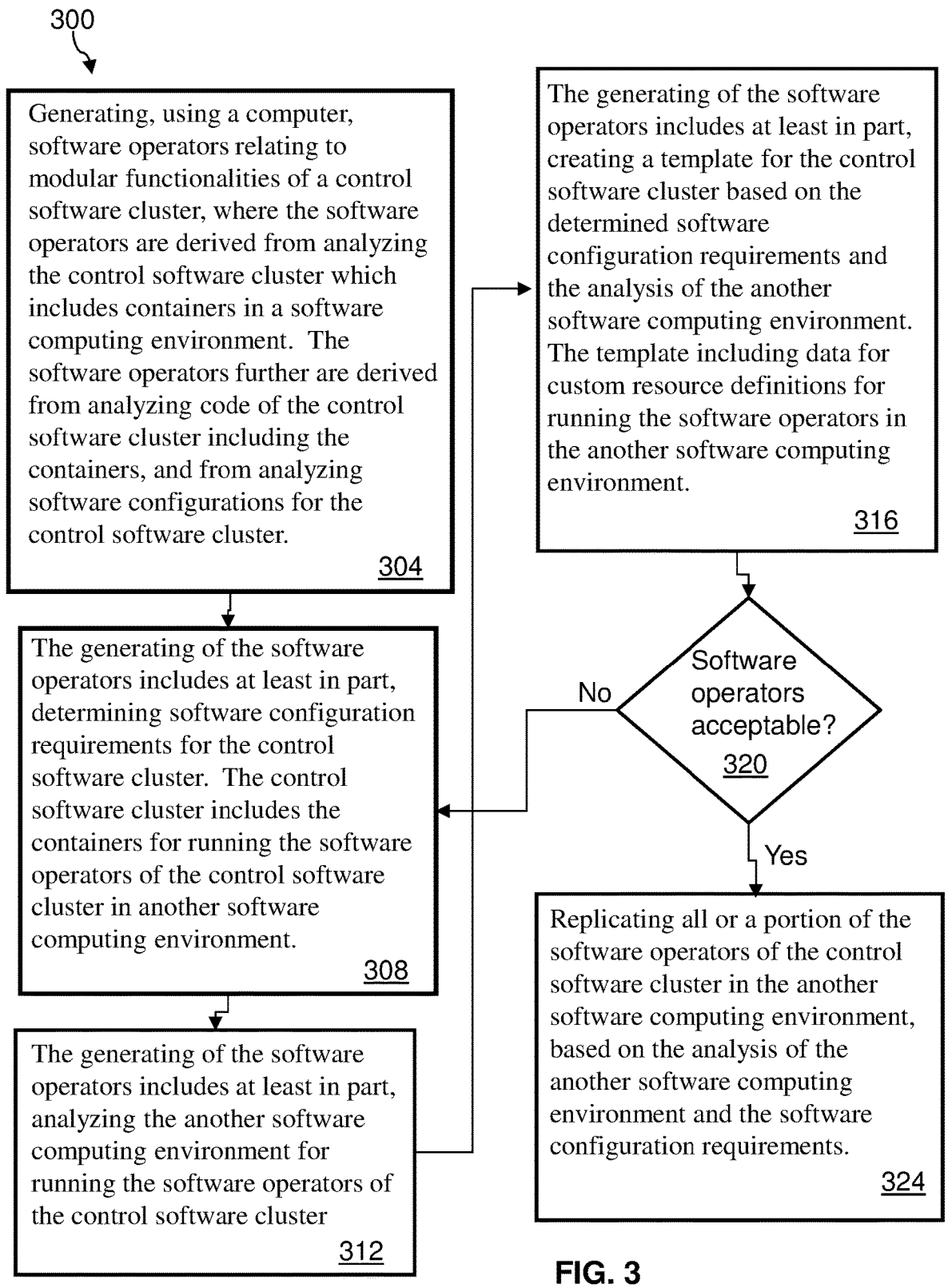
FIG. 3 is a flow chart illustrating a method, implemented using the system shown in FIG. 2, for replicating a software cluster including containers to another computing environment.

Referring to FIGS. 2 and 3, in another embodiment according to the present disclosure, a computer implemented method 300 (with reference to a system 200) using control software 238 and containers, for replicating a control software cluster 236, for example in a first computing environment 230, in another computing environment, for example a second computing environment. The first computing environment includes a computer 231 including a processor 232 for executing code. The computer 231 includes a storage medium 234 which can store an application 235 and a software cluster 236. The second computing environment can also include a computer 241. A user or operator 246 can initiate and manage operational procedures using the computer 231.

The method 300 includes generating, using the computer, software operators 248 relating to modular functionalities of the control software cluster. The software operators are derived from analyzing the control software cluster 236 which includes containers in the first software computing environment. The software operators further are derived from analyzing code of the control software cluster including the containers, and from analyzing software configurations for the control software cluster, as represented in operation block 304.

The method 300 includes the generating of the software operators include at least in part, determining software configuration requirements for the control software cluster. The control software cluster including the containers for running the software operators of the control software cluster in another or second software computing environment, as in block 308. The generating of the software operators includes at least in part, analyzing another or second software computing environment, for example the second computing environment 240, for running the software operators of the control software cluster, as in block 312.

Further, the generating of the software operators includes at least in part, creating a template for the control software cluster based on the determined software configuration requirements and the analysis of another or the second software computing environment. The template including data for custom resource definitions for running the software operators in another or the second software computing environment, as in block 316.

If the software operators are not acceptable at block 320, the method returns to block 308. If the software operators are acceptable, the method proceeds to block 324. The method includes replicating all or a portion of the software operators of the control software cluster in another software computing environment such as the second computing environment 240, based on the analysis of the second software computing environment and the software configuration requirements, as in block 324.

In one example, the analyzing of another or the second software computing environment includes comparing configuration requirements of the control software cluster to the another software computing environment. In another example, the method can further include receiving, at the computer, a selection, from an operator, of components of the software computing environment for the generation of the software operators.

In one example, the method can further include analyzing the software operators to determine hierarchies for each of the software operators, and recreating an instance of the control software cluster in another or a second software computing environment, based on the hierarchies. In another example, the control software cluster is a running application in the computing environment, and the running application includes software code being executed by a processor.

In another example, the software computing environment and the another or second software computing environments are different cloud computing environments.

In another example, the software operators are created in response to the analyzing of the another or second software computing environment and the creating of the template, and the analyzing of the containers of the control software cluster determines a hierarchy for each of the software operators.

Figure 4:
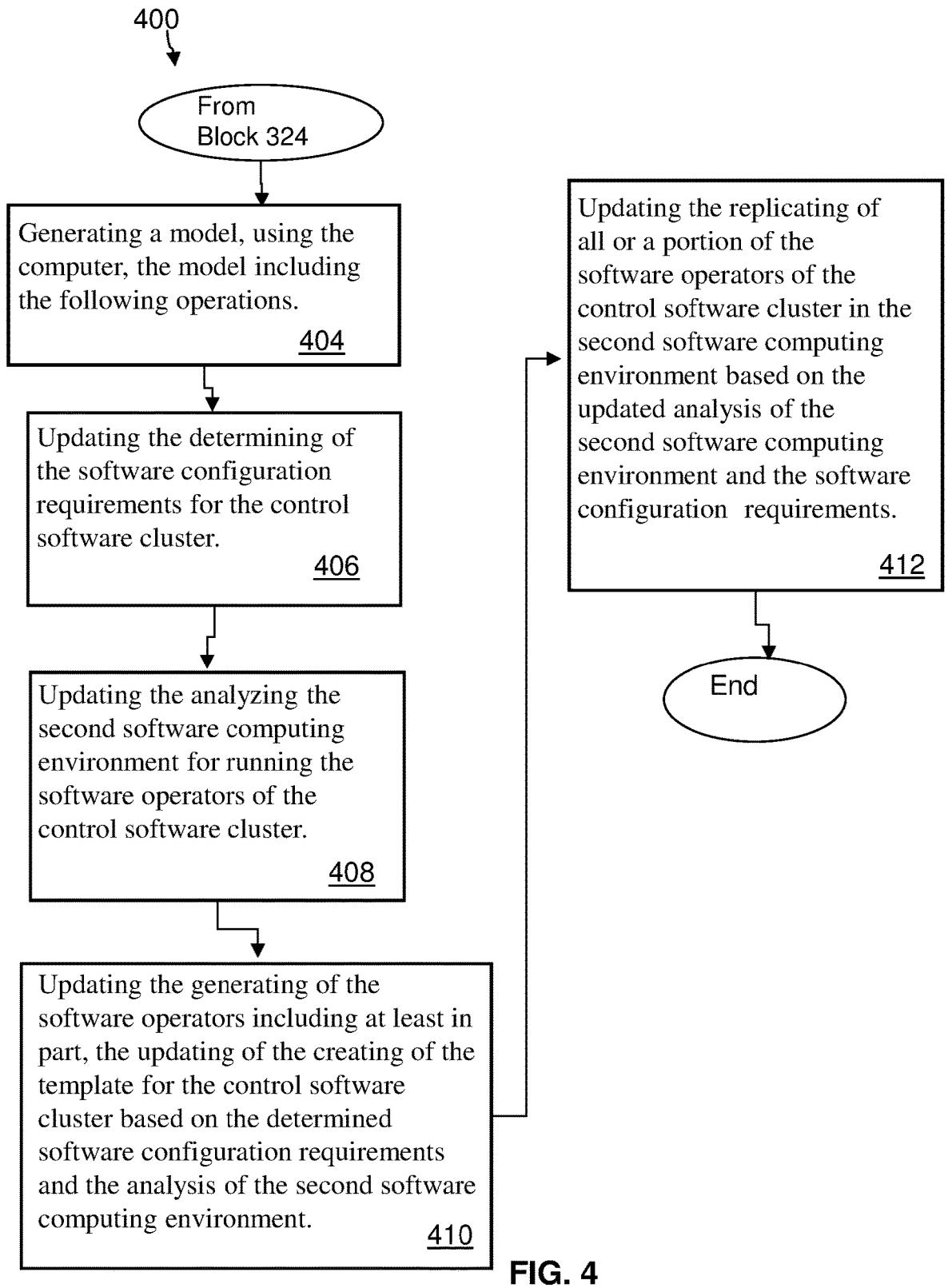
FIG. 4 is a flow chart illustrating another method, which continues from the flow chart of FIG. 3, for replicating a software cluster including containers to another computing environment.

Referring to FIG. 4, a method 400 continues from the method 300 at block 324. The method 400 includes generating a model, using the computer, as in block 404, the model including the following operations. The method includes updating the determining of the software configuration requirements for the control software cluster, as in block 406. The method includes updating the analyzing of the second software computing environment for running the software operators of the control software cluster, as in block 408. The method includes updating the generating of the software operators including at least in part, the updating of the creating of the template for the control software cluster based on the determined software configuration requirements and the analysis of the second software computing environment. The method including updating the replicating of all or a portion of the software operators of the control software cluster in the another or second software computing environment based on the updated analysis of the another or second software computing environment and the software configuration requirements, as in block 412. In one example, the method can include iteratively generating the model to produce updated models.

Additional Examples and Embodiments

Referring to the figures, and for example, FIG. 2, a computer 231 can be integral to or communicating with a device. A computer 290 remote from the computer can electronically communicate, in all or in part, with the computer 272 as part of a control system 270. The control system can include the computer 272 having a computer readable storage medium 273 which can store one or more programs 274, and a processor 275 for executing program instructions. The control system can also include a storage medium which can include registration and/or account data 282 and profiles 283 of users or entities (such entities can include robotic entities) as part of user accounts 281. User accounts 281 can be stored on a storage medium 280 which is part of the control system 270. The user accounts 281 can include registrations and account data 282 and user profiles 283. The control system can also include a computer 272 having a computer readable storage medium 273 which can store programs or code embedded on the storage medium. The program code can be executed by a processor 275. The computer 272 can communicate with a database 276. The control system 270 can also include a database 276 for storing all or part of such data as described above, and other data.

The control system can also communicate with a computer system 290 which can include a learning engine/module 292 and a knowledge corpus or database 296. The computer system 290 can also communicate with the computer 231 and can be remote from the computer. In another example, the computer system 290 can be all or part of the control system, or all or part of a device. The depiction of the computer system 290 as well as the other components of the system 200 are shown as one example according to the present disclosure. One or more computer systems can communicate with a communications network 260, e.g., the Internet. For example, the computer 290, and the control system 270 can communicate with the communications network 260, and the computer 231 can communicate with a local communications network which can communicate with the communications network 260.

In one example, a new or different AI (Artificial Intelligence) ecosystem, or technology/communication or IT (Information Technology) ecosystem can include a local communications network which can communicate with the communications network 260. The system 200 can include a learning engine/module 292, which can be at least part of the control system or communicating with the control system, for generating a model or learning model.

In another example, the computer 231 can be part of a device. The computer can include a processor and a computer readable storage medium where an application 235 can be stored which can in one example, embody all or part of the method of the present disclosure. The application can include all or part of instructions to implement the method of the present disclosure, embodied in code and stored on a computer readable storage medium. In one example, a device can include a display. The device can operate, in all or in part, in conjunction with a remote server by way of a communications network, for example, the Internet.

The method can include an analysis generating a model based on received data. A model can also be generated by an AI system, at least in part. In one example, an AI system can generate a model using an AI system analysis using machine learning.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

Methods and systems according to embodiments of the present disclosure, can be incorporated in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

The control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device. The application is stored on the device or computer and can access data and additional programs at the back end of the application, for example, in the program(s) stored in the control system.

The program(s) can include, all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, as part of the analysis of received data including data in the knowledge corpus and historical database, which can be populated by historical data gathered, for example, from sensors, robotic device, or other machines or devices.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

In one example, the system of the present disclosure can include a control system communicating with the user device via a communications network. The control system can incorporate all or part of an application or software for implementing the method of the present disclosure. The control system can include a computer readable storage medium where account data and/or registration data can be stored. User profiles can be part of the account data and stored on the storage medium. The control system can include a computer having computer readable storage medium and software programs stored therein. A processor can be used to execute or implement the instructions of the software program. The control system can also include a database.

In another example and embodiment, profiles can be saved for entities such as users, participants, operators, human operators, or robotic devices. Such profiles can supply data regarding the user and history of deliveries for analysis. In one example, a user can register or create an account using the control system which can include one or more profiles as part of registration and/or account data. The registration can include profiles for each user having personalized data. For example, users can register using a website via their computer and GUI (Graphical User Interface) interface. The registration or account data can include profiles for an account for each user. Such accounts can be stored on the control system, which can also use the database for data storage. A user and a related account can refer to, for example, a person, or an entity, or a corporate entity, or a corporate department, or another machine such as an entity for automation such as a system using, in all or in part, artificial intelligence.

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

More Examples and Embodiments

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants. It is also understood that machine and device are used interchangeable herein to refer to machine or devices in one or ecosystems or environments, which can include, for example and artificial intelligence (AI) environment.

Still Further Embodiments and Examples

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to return to a previous operation or proceed as directed, for example as represented by a operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

Additional Embodiments and Examples

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for generating a model or a learning model as discussed herein in embodiments of the present disclosure. An Artificial Intelligence (AI) System can include machines, computer, and computer programs which are designed to be intelligent or mirror intelligence. Such systems can include computers executing algorithms. AI can include machine learning and deep learning. For example, deep learning can include neural networks. An AI system can be cloud based, that is, using a cloud-based computing environment having computing resources. In another example, a control system can be all or part of an Artificial Intelligence (AI) system. For example, the control system can be one or more components of an AI system.

It is also understood that methods and systems according to embodiments of the present disclosure, can be incorporated into (Artificial Intelligence) AI devices, components or be part of an AI system, which can communicate with respective AI systems and components, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Figure 5:
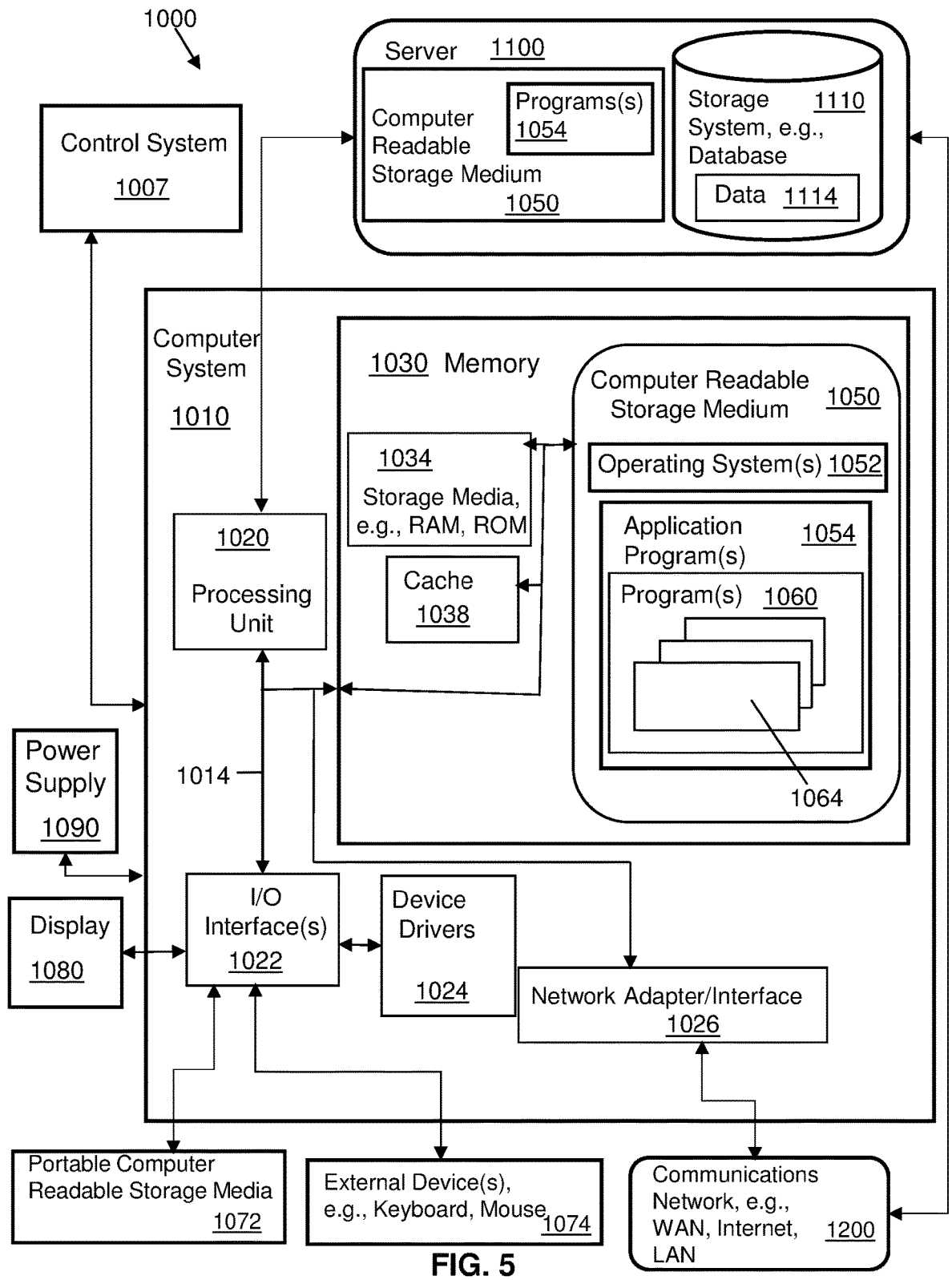
FIG. 5 is a schematic block diagram depicting a computer system according to an embodiment of the disclosure which may be incorporated, all or in part, in one or more computers or devices, and cooperates with the systems and methods shown in the FIGS.

Referring to FIG. 5, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 1007, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in other figures can include all or part of the computer system 1010 and its components, and/or the one or more computers can communicate with all or part of the computer system 1010 and its components as a remote computer system, to achieve the computer functions described in the present disclosure. For example, the control system 1007 can be a representation, in all or part, of a control system depicted in other figures herein.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embedment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. A power supply 1090 can also connect to the computer using an electrical power supply interface (not shown). Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
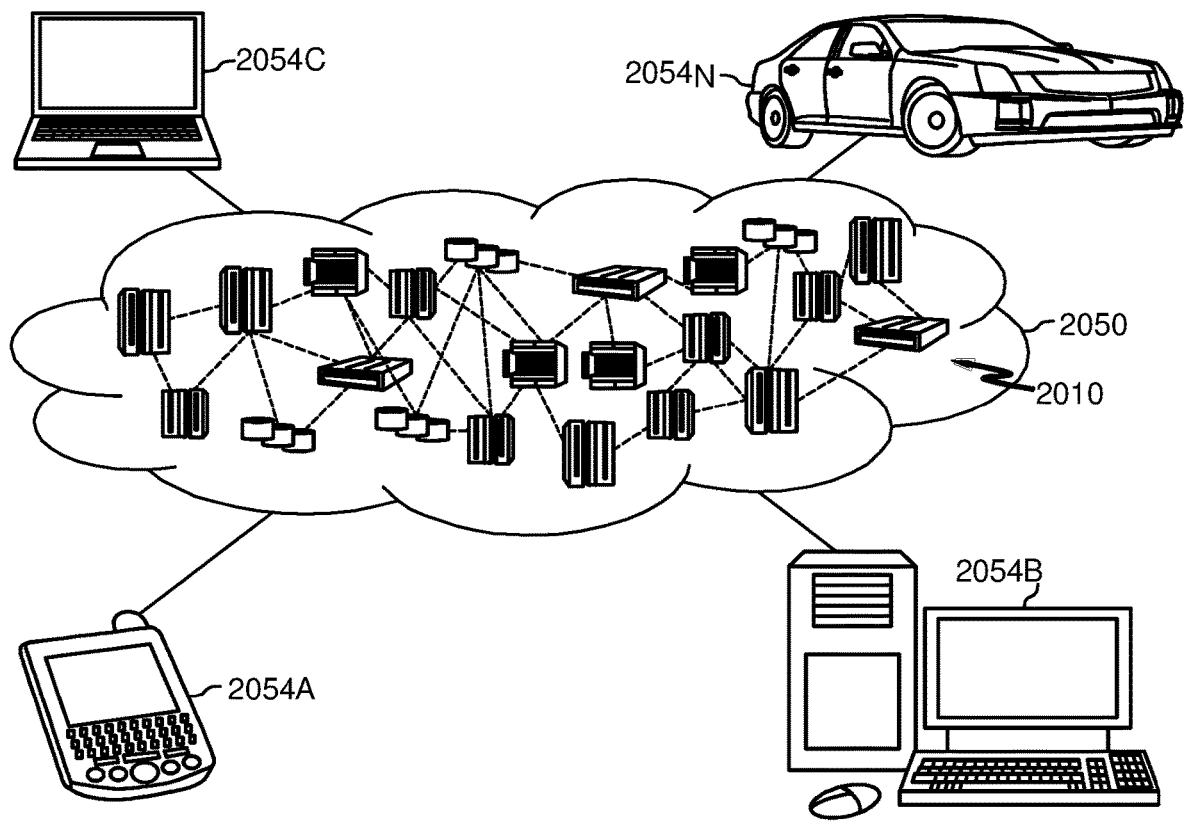
FIG. 6 is a block diagram depicting a cloud computing environment according to an embodiment of the present invention.

Referring now to FIG. 6, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 6 are intended to be illustrative only and that computing nodes 2010 and cloud computing environment 2050 can communicate with any type of computerized device over any type of network and/or network addressable connection (e.g., using a web browser).

Figure 7:
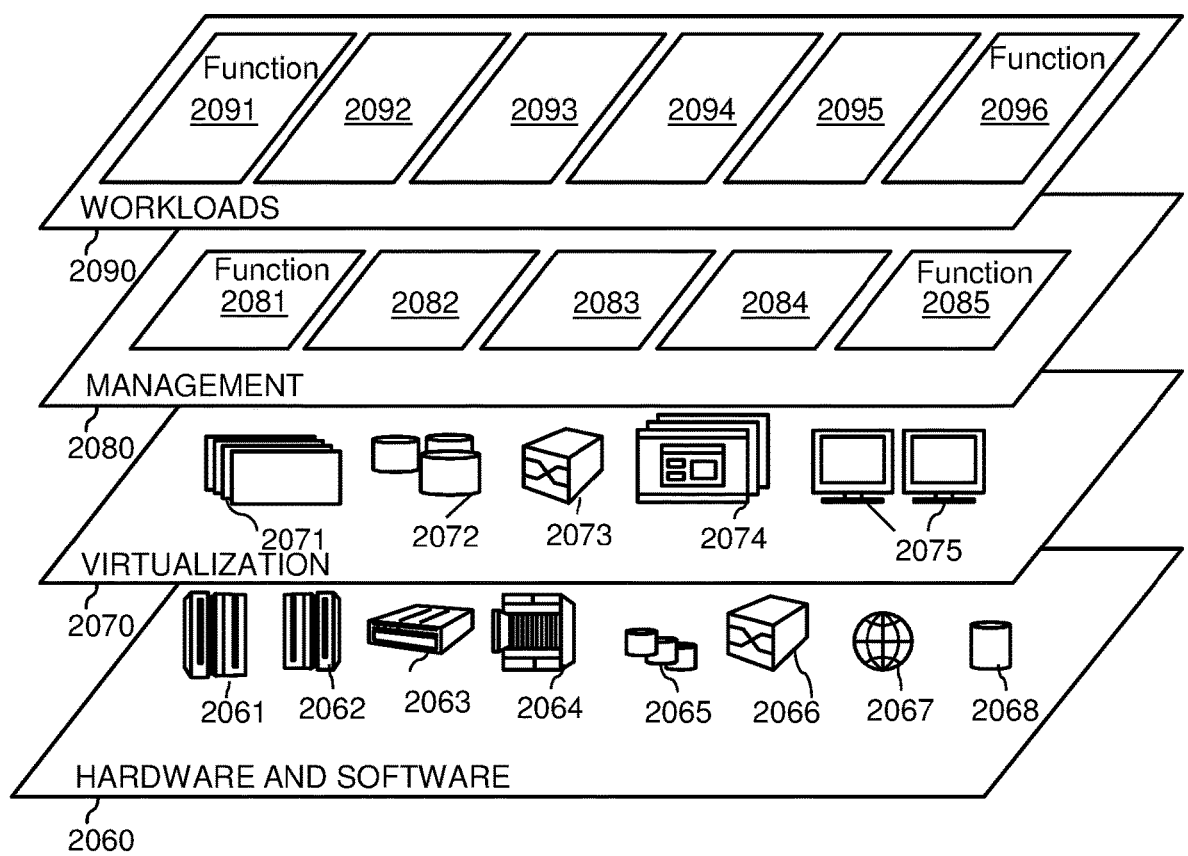
FIG. 7 is a block diagram depicting abstraction model layers according to an embodiment of the present invention.

Referring now to FIG. 7, a set of functional abstraction layers provided by cloud computing environment 2050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and software replication in a multicloud environment 2096, for example, using control software.

What is claimed is:

1. A computer-implemented method using control software for replicating a software cluster including containers to another computing environment, comprising:
   generating, using a computer, software operators relating to modular functionalities of a control software cluster, by decomposing the control software cluster, the software operators being derived from analyzing the control software cluster which includes containers in a software computing environment, the software operators further being derived from analyzing code of the control software cluster including the containers, and from analyzing software configurations for the control software cluster;
   the generating of the software operators including at least in part, determining software configuration requirements for the control software cluster, the control software cluster including the containers for running the software operators of the control software cluster in another software computing environment;
   the generating of the software operators including at least in part, analyzing the another software computing environment for running the software operators of the control software cluster;
   the generating of the software operators including at least in part, creating a template for the control software cluster based on the determined software configuration requirements and the analysis of the another software computing environment, the template including data for custom resource definitions for running the software operators in the another software computing environment;
   replicating all or a portion of the software operators of the control software cluster in the another software computing environment based on the analysis of the another software computing environment and the software configuration requirements;
   analyzing the software operators to determine hierarchies for each of the software operators;
   recreating an instance of the control software cluster in the another software computing environment, based on the hierarchies which includes the software operators being applied to the another software computing environment in an order;
   generating a model, using the computer; the model including the following;
   updating the determining of the software configuration requirements for the control software cluster;
   updating the analyzing of the another software computing environment for running the software operators of the control software cluster;
   updating the generating of the software operators including at least in part, the updating of the creating of the template for the control software cluster based on the determined software configuration requirements and the analysis of the another software computing environment;
   updating the replicating of all or a portion of the software operators of the control software cluster in the another software computing environment based on the updated analysis of the another software computing environment and the software configuration requirements; and
   iteratively generating the model to produce updated models.

2. The method of claim 1, wherein the analyzing of the another software computing environment includes comparing configuration requirements of the control software cluster to the another software computing environment.

3. The method of claim 1, further comprising:
   receiving, at the computer, a selection, from an operator, of components of the software computing environment for the generation of the software operators.

4. The method of claim 1, wherein the control software cluster is a running application in the computing environment, wherein the running application includes software code being executed by a processor.

5. The method of claim 1, wherein the software computing environment and the another software computing environments are different cloud computing environments.

6. The method of claim 1, wherein the software operators are created in response to the analyzing of the another software computing environment and the creating of the template, the analyzing of the containers of the control software cluster to determine a hierarchy for each of the software operators.

7. A system using control software for replicating a software cluster including containers to another computing environment, which comprises:
   a computer system comprising: a computer processor, a computer-readable storage medium, and program instructions stored on the computer-readable storage medium being executable by the processor, to cause the computer system to perform the following functions to;

generate, using a computer, software operators relating to modular functionalities of a control software cluster, by decomposing the control software cluster, the software operators being derived from analyzing the control software cluster which includes containers in a software computing environment, the software operators further being derived from analyzing code of the control software cluster including the containers, and from analyzing software configurations for the control software cluster;

the generating of the software operators includes, at least in part, to determine software configuration requirements for the control software cluster, the control software cluster including the containers for running the software operators of the control software cluster in another software computing environment;

the generating of the software operators includes, at least in part, to analyze the another software computing environment for running the software operators of the control software cluster;

the generating of the software operators includes, at least in part, to create a template for the control software cluster based on the determined software configuration requirements and the analysis of the another software computing environment, the template including data for custom resource definitions for running the software operators in the another software computing environment;

replicate all or a portion of the software operators of the control software cluster in the another software computing environment based on the analysis of the another software computing environment and the software configuration requirements;

analyzing the software operators to determine hierarchies for each of the software operators;

recreating an instance of the control software cluster in the another software computing environment, based on the hierarchies which includes the software operators being applied to the another software computing environment in an order;

generating a model, using the computer; the model including the following;

updating the determining of the software configuration requirements for the control software cluster;

updating the analyzing of the another software computing environment for running the software operators of the control software cluster;

updating the generating of the software operators including at least in part, the updating of the creating of the template for the control software cluster based on the determined software configuration requirements and the analysis of the another software computing environment;

updating the replicating of all or a portion of the software operators of the control software cluster in the another software computing environment based on the updated analysis of the another software computing environment and the software configuration requirements; and iteratively generating the model to produce updated models.

8. The system of claim 7, wherein the analyzing of the another software computing environment includes comparing configuration requirements of the control software cluster to the another software computing environment.

9. The system of claim 7, further comprising functions to:
receive, at the computer, a selection, from an operator, of components of the software computing environment for the generation of the software operators.

10. The system of claim 7, wherein the control software cluster is a running application in the computing environment, wherein the running application includes software code being executed by a processor.

11. The system of claim 7, wherein the software computing environment and the another software computing environments are different cloud computing environments.

12. The system of claim 7, wherein the software operators are created in response to the analyzing of the another software computing environment and the creating of the template, the analyzing of the containers of the control software cluster to determine a hierarchy for each of the software operators.

13. A computer program product using control software for replicating a software cluster including containers to another computing environment, the computer program product comprising a computer readable storage medium having program instructions embodied therewith, the program instructions executable by a computer to cause the computer to perform functions, by the computer, comprising the functions to:

generate, using a computer, software operators relating to modular functionalities of a control software cluster, by decomposing the control software cluster, the software operators being derived from analyzing the control software cluster which includes containers in a software computing environment, the software operators further being derived from analyzing code of the control software cluster including the containers, and from analyzing software configurations for the control software cluster;

the generating of the software operators includes, at least in part, to determine software configuration requirements for the control software cluster, the control software cluster including the containers for running the software operators of the control software cluster in another software computing environment;

the generating of the software operators includes, at least in part, to analyze the another software computing environment for running the software operators of the control software cluster;

the generating of the software operators includes, at least in part, to create a template for the control software cluster based on the determined software configuration requirements and the analysis of the another software computing environment, the template including data for custom resource definitions for running the software operators in the another software computing environment;

replicate all or a portion of the software operators of the control software cluster in the another software computing environment based on the analysis of the another software computing environment and the software configuration requirements;

analyzing the software operators to determine hierarchies for each of the software operators;

recreating an instance of the control software cluster in the another software computing environment, based on the hierarchies which includes the software operators being applied to the another software computing environment in an order;

generating a model, using the computer; the model including the following;

updating the determining of the software configuration requirements for the control software cluster;

updating the analyzing of the another software computing environment for running the software operators of the control software cluster;

updating the generating of the software operators including at least in part, the updating of the creating of the template for the control software cluster based on the determined software configuration requirements and the analysis of the another software computing environment;

updating the replicating of all or a portion of the software operators of the control software cluster in the another software computing environment based on the updated analysis of the another software computing environment and the software configuration requirements; and iteratively generating the model to produce updated models.

14. The computer program product of claim 13, wherein the analyzing of the another software computing environment includes comparing configuration requirements of the control software cluster to the another software computing environment.

15. The computer program product of claim 13, further comprising:

receive, at the computer, a selection, from an operator, of components of the software computing environment for the generation of the software operators.

\* \* \* \* \*